US012625612B2

(12) United States Patent
Sim et al.

(10) Patent No.: US 12,625,612 B2
(45) Date of Patent: May 12, 2026

(54) ELECTRONIC DEVICE FOR MANAGING MEMORY AND OPERATING METHOD THEREOF

(71) Applicant: SAMSUNG ELECTRONICS CO., LTD., Suwon-si (KR)

(72) Inventors: Jaeseon Sim, Suwon-si (KR); Chulmin Kim, Suwon-si (KR); Ohoon Kwon, Suwon-si (KR); Jaewon Kim, Suwon-si (KR); Sooyong Suk, Suwon-si (KR); Yongtaek Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 17/761,556

(22) Filed: Mar. 17, 2022

(65) Prior Publication Data

US 2024/0211137 A1 Jun. 27, 2024

Related U.S. Application Data

(63) Continuation of application No. PCT/KR2022/002811, filed on Feb. 25, 2022.

(30) Foreign Application Priority Data

Mar. 30, 2021 (KR) ........................ 10-2021-0041401

(51) Int. Cl.
G06F 3/06 (2006.01)

(52) U.S. Cl.
CPC .......... G06F 3/0611 (2013.01); G06F 3/0643 (2013.01); G06F 3/067 (2013.01)

(58) Field of Classification Search
CPC ...... G06F 3/0611; G06F 3/0643; G06F 3/067; G06F 3/06; G06F 3/061; G06F 3/0653;
(Continued)

(56) References Cited

U.S. PATENT DOCUMENTS

| | | | |
|---|---|---|---|
| 5,305,389 A | 4/1994 | Palmer | |
| 8,788,628 B1 | 7/2014 | Taylor et al. | |

(Continued)

FOREIGN PATENT DOCUMENTS

| | | |
|---|---|---|
| KR | 10-1064178 | 9/2011 |
| KR | 10-2017-0054633 | 5/2017 |

(Continued)

OTHER PUBLICATIONS

Search Report and Written Opinion dated May 30, 2022 issued in International Patent Application No. PCT/KR2022/002811.

(Continued)

*Primary Examiner* — Rocio Del Mar Perez-Velez
*Assistant Examiner* — Julian S Mendel
(74) *Attorney, Agent, or Firm* — Nixon & Vanderhye, P.C.

(57) ABSTRACT

An example electronic device may include first memory configured to store data related to a file, a second memory configured to temporarily store at least part of the data related to the file, and a processor operatively connected to the first memory and the second memory, wherein the processor may be configured to: monitor access to the data related to the file stored in the first memory for a specified time based on performing of an application program, configure a first access pattern for a first group including the at least part of the data related to the file stored in the first memory based on a monitoring result, and load data of the first group related to the file stored in the first memory into the second memory based on the first access pattern, based on the application program requesting access to the data included in the first group.

9 Claims, 14 Drawing Sheets

(58) Field of Classification Search

CPC .. G06F 12/06; G06F 12/0811; G06F 12/0882; G06F 12/0638

See application file for complete search history.

(56) References Cited

U.S. PATENT DOCUMENTS

| | | | | |
|---|---|---|---|---|
| 9,703,611 | B1* | 7/2017 | Christopher | G06F 9/5027 |
| 9,886,384 | B2 | 2/2018 | Kim et al. | |
| 10,248,576 | B2 | 4/2019 | Jin et al. | |
| 10,346,360 | B1* | 7/2019 | Basov | G06F 16/182 |
| 10,853,322 | B1* | 12/2020 | Tsaur | G06F 16/2445 |
| 11,184,797 | B2 | 11/2021 | Abou-Elkheir et al. | |
| 2010/0169708 | A1 | 7/2010 | Rudelic et al. | |
| 2010/0250859 | A1 | 9/2010 | Hooker et al. | |
| 2015/0067258 | A1* | 3/2015 | Jung | G06F 12/0868 |
| | | | | 711/119 |
| 2017/0034297 | A1* | 2/2017 | Waheed | H04L 43/0817 |
| 2017/0060925 | A1* | 3/2017 | Levandoski | G06F 16/2282 |
| 2017/0131917 | A1 | 5/2017 | Yun et al. | |
| 2017/0147227 | A1* | 5/2017 | Stabrawa | G06F 3/065 |
| 2017/0220296 | A1* | 8/2017 | Kim | G06F 3/065 |
| 2017/0357600 | A1 | 12/2017 | Moon | |
| 2018/0143994 | A1* | 5/2018 | Ohtsuji | G06F 3/0611 |
| 2019/0243570 | A1 | 8/2019 | Mittal et al. | |
| 2020/0250097 | A1* | 8/2020 | Holland | G06F 12/1009 |
| 2021/0081326 | A1 | 3/2021 | Curewitz et al. | |
| 2021/0103446 | A1* | 4/2021 | Yudanov | G06F 9/445 |

FOREIGN PATENT DOCUMENTS

| | | |
|---|---|---|
| KR | 10-2017-0138765 | 12/2017 |
| KR | 10-1940382 | 1/2019 |
| KR | 10-2020-0108362 | 9/2020 |

OTHER PUBLICATIONS

Office Action datd Mar.5, 2026 in KR Application No. 10-2021-0041401 and English-language translation.

* cited by examiner

ELECTRONIC DEVICE FOR MANAGING MEMORY AND OPERATING METHOD THEREOF

CROSS-REFERENCE TO RELATED APPLICATIONS

This application is a continuation of International Application No. PCT/KR2022/002811 designating the United States, filed on Feb. 25, 2022, in the Korean Intellectual Property Receiving Office and claiming priority to Korean Patent Application No. 10-2021-0041401 filed on Mar. 30, 2021, in the Korean Intellectual Property Office, the disclosures of which are incorporated by reference herein in their entireties.

BACKGROUND

Field

The disclosure relates to a device and a method for managing a memory in an electronic device.

Description of Related Art

With the development of information and communication technology and semiconductor technology, electronic devices may provide various multimedia functions and may thus generate and/or store various sizes and types of data.

An electronic device may employ a virtual memory management technique for efficiently storing and/or managing data. For example, the virtual memory management technique is a method for managing data by matching a main memory (e.g., a dynamic random access memory (DRAM)) to a storage (e.g., a nonvolatile memory) and may include a demand paging method of loading at least part of data (e.g., a page) required by a processor among data stored in a storage into a main memory and processing the data.

When a demand paging method is employed, an electronic device may use a page cache for prefetching at least part of data stored in a storage into a main memory before a process requests the data. For example, when using the page cache, the electronic device may prefetch not only the data (e.g., a page) requested by the processor but also other data (e.g., a page) into the main memory, based on a predetermined memory access pattern. The predefined memory access pattern may include a memory access pattern configured based on an application program requiring the data.

However, when a predefined memory access pattern for prefetching data into the main memory and a pattern for the application program to use the data are different, the electronic device may experience a decrease in memory management efficiency.

SUMMARY

Embodiments of the disclosure disclose a device and a method for adaptively generating and/or applying a memory access pattern for a page cache in an electronic device.

According to various example embodiments, an electronic device may include: a first memory configured to store data related to a file, a second memory configured to temporarily store at least part of the data related to the file, and a processor operatively connected to the first memory and the second memory, wherein the processor may be configured to: monitor access to the data related to the file stored in the first memory for a specified time, based on performing of an application program, configure a first access pattern for a first group including the at least part of the data related to the file stored in the first memory, based on a monitoring result, and load data of the first group related to the file stored in the first memory into the second memory, based on the first access pattern, based on the application program requesting access to the data included in the first group.

According to various example embodiments, a method of operating an electronic device including a first memory configured to store data related to a file and a second memory configured to temporarily store at least part of the data related to the file may include: monitoring access to the data related to the file stored in the first memory for a specified time, based on performing of an application program, configuring a first access pattern for a first group including the at least part of the data related to the file stored in the first memory, based on a monitoring result, and loading data of the first group related to the file stored in the first memory into the second memory, based on the first access pattern, based on the application program requesting access to the data included in the first group.

According to various example embodiments of the disclosure, an electronic device may adaptively generate and/or apply a memory access pattern for a page cache, based on the result of monitoring access to data stored in a storage, thereby reducing a delay in accessing a file and increasing efficiency in memory management.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to attached drawings.

Figure 1:
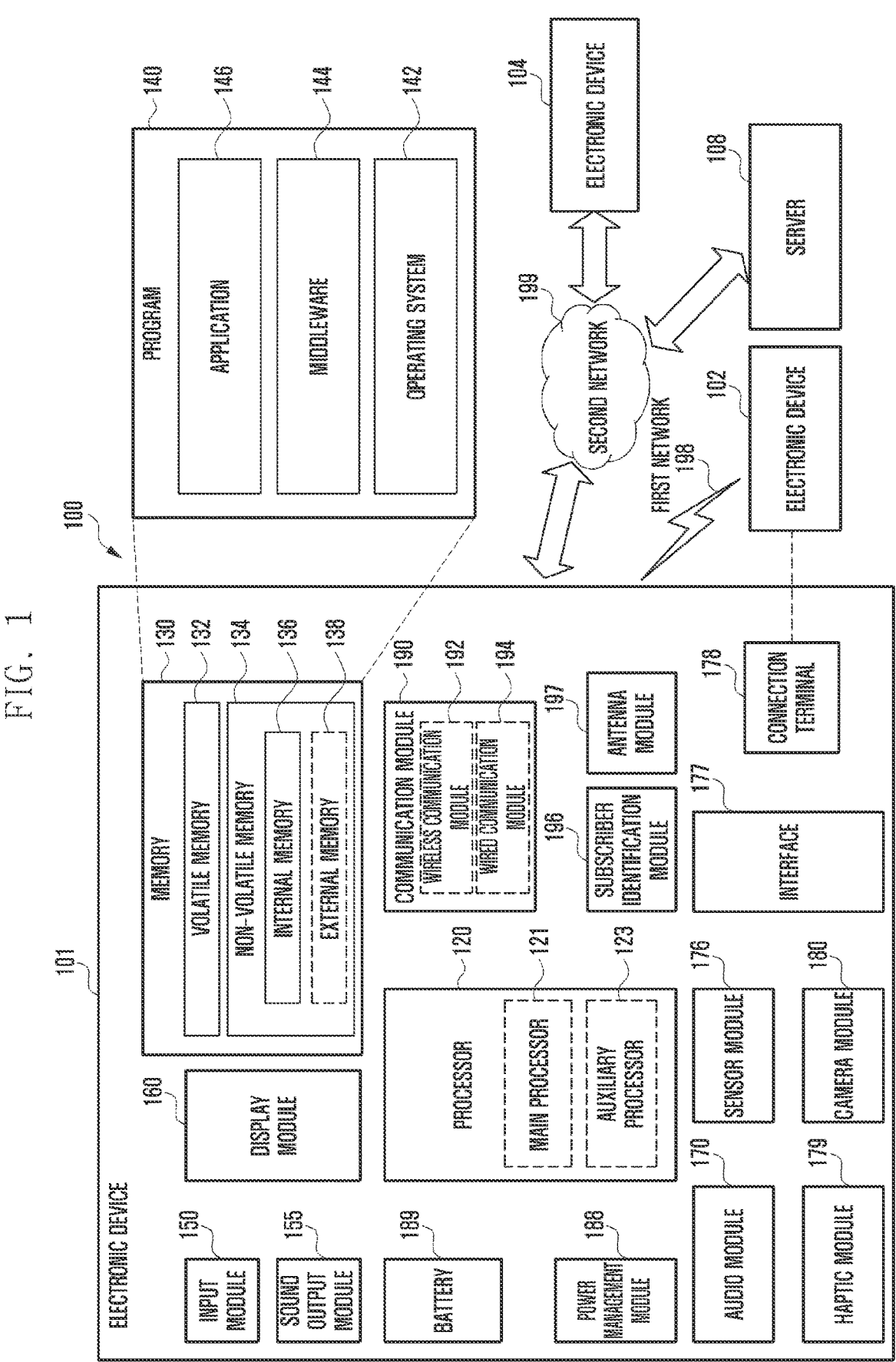
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
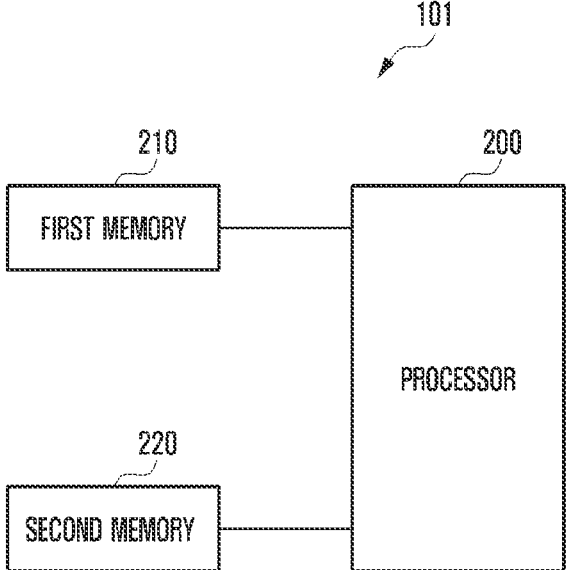
FIG. 2 is a block diagram illustrating an example configuration of an electronic device for memory management according to various embodiments.

FIG. 2 is a block diagram illustrating an example configuration of an electronic device for memory management according to various embodiments. According to an embodiment, the electronic device 101 of FIG. 2 may be at least partly similar to the electronic device 101 of FIG. 1 or may further include other embodiments of an electronic device.

Referring to FIG. 2, according to various embodiments, the electronic device 101 may include a processor (e.g., including processing circuitry) 200, a first memory 210, and/or a second memory 220. According to an embodiment, the processor 200 may be substantially the same as the processor 120 of FIG. 1 or may be included in the processor 120. The first memory 210 may be substantially the same as the nonvolatile memory 134 of FIG. 1 or may be included in the nonvolatile memory 134. The second memory 220 may be substantially the same as the volatile memory 132 of FIG. 1 or may be included in the volatile memory 132.

According to various embodiments, the first memory 210 and the second memory 220 may store various types of data used by at least one component (e.g., the processor 200) of the electronic device 101. According to an embodiment, the first memory 210 (e.g., a storage device) may be a nonvolatile memory, and may retain data stored in the first memory 210 even when power supply to the first memory 210 is cut off. For example, the first memory 210 may include at least one of a flash memory, a read-only memory (ROM), or a hard disk. According to an embodiment, the second memory 220 (e.g., a main memory) may be a volatile memory, and may delete data stored in the second memory 220 when power supply to the second memory 220 is cut off. The second memory 220 has a faster writing speed and/or a faster reading speed than the first memory 210, and may include a random-access memory (RAM, e.g., a DRAM).

According to various embodiments, the processor 200 may include various processing circuitry and control the first memory 210 and/or the second memory 220 operatively connected to the processor 200.

According to various embodiments, the processor 200 may monitor access to a file stored in the first memory 210. According to an embodiment, when an application program requires a first file, the processor 200 may identify an offset of a page to which access occurs among a plurality of pages forming the first file stored in the first memory 210 and/or information about a time when the access occurs. For example, monitoring the first memory 210 may include a series of operations of identifying information related to an operation (e.g., a major fault) of accessing data stored in the first memory 210 by the processor 200. For example, a page may refer to a unit for managing data related to a file stored in the first memory 210 and/or the second memory 220. For example, data related to a file may include data forming the file. For example, an offset of a page may include information related to the position of the page accessed by the processor 200 among a plurality of pages forming a file. According to an embodiment, the processor 200 may periodically monitor access to at least one file stored in the first memory 210. According to an embodiment, when the size of monitoring information (e.g., a log) collected through monitoring related to the first file satisfies a first reference size, the processor 200 may end the monitoring related to the first file. For example, a state of satisfying the first reference size may include a state in which the size of the monitoring information (e.g., the log) collected through the monitoring related to the first file is equal to or greater than the first reference size. For example, the first reference size may refer, for example, to the size of monitoring information configured to determine the end time of monitoring related to a file and may be configured based on the size of a file monitored.

According to an embodiment, the processor 200 may selectively monitor the first memory 210, based on the load of the processor 200 and/or the load of the second memory 220. For example, when the load of the processor 200 satisfies a specified first condition and the load of the second memory 220 satisfies a specified second condition, the processor 200 may monitor the first memory 210. For example, a state of satisfying the specified first condition may include a state in which the usage level of the processor 200 is less than or equal to a predefined (e.g., specified) reference usage level. For example, a state of satisfying the specified second condition may include a state in which the size of available space of the second memory 220 exceeds a predefined (e.g., specified) reference memory size. For example, when the load of the processor 200 does not satisfy the specified first condition or the load of the second memory 220 does not satisfy the specified second condition, the processor 200 may restrict monitoring of the first memory 210. For example, a state of not satisfying the specified first condition may include a state in which the usage level of the processor 200 exceeds the predefined reference usage level. For example, a state of not satisfying the specified second condition may include a state in which the size of available space of the second memory 220 is less than or equal to the predefined reference memory size.

According to various embodiments, the processor 200 may configure a memory access pattern related to the file, based on the result of monitoring the first memory 210. According to an embodiment, when the size of the monitoring information (e.g., the log) collected through the monitoring related to the first file satisfies a second reference size, the processor 200 may configure at least one memory access pattern suitable for the first file, based on the result of the monitoring related to the first file. For example, a state of satisfying the second reference size may include a state in which the size of the monitoring information (e.g., the log) collected through the monitoring related to the first file is equal to or greater than the second reference size. For example, the second reference size is the size of monitoring information configured to determine whether a monitoring access pattern can be configured and may include a size relatively smaller than the first reference size. According to an embodiment, when it is determined that an error occurs in the memory access pattern used to load at least one page (e.g., data) related to the first file into the second memory 220, the processor 200 may configure at least one memory access pattern suitable for the first file, based on the result of the monitoring related to the first file. For example, when a page (e.g., data) of the first file required by the application program does not exist in the second memory 220, the processor 200 may request the page (e.g., the data) of the first file required by the application program from the first memory 210. When the number of requests for the page (e.g., the data) to the first memory 210 monitored for a specified time exceeds a reference number, the processor 200 may determine that an error has occurred in the memory access pattern used to load the page (e.g., data) related to the first file into the second memory 220.

According to an embodiment, when the structure of the first file is changed, the processor 200 may configure the at least one memory access pattern suitable for the first file, based on a monitoring result related to the first file. For example, changing the structure of the first file may include a series of operations of adding new data to the first file, or deleting or changing at least part of data included in the first file.

According to an embodiment, the processor 200 may configure at least one memory access pattern suitable for each part of the first file, based on the monitoring result of the first memory 210. For example, the processor 200 may identify at least one pattern for loading at least one page included in the first file stored in the first memory 210 into the second memory 220, based on the monitoring result. The processor 200 may divide pages included in the first file into at least one group, based on at least one pattern, and may configure at least one memory access pattern for each group. For example, one page included in the first file may be included in at least one group.

According to an embodiment, the memory access pattern may include information about a criterion for selecting at least one page to be loaded at once into the second memory 220 among the plurality of pages related to the first file stored in the memory 210, based on a page cache. For example, the memory access pattern includes a first access pattern for loading at least one page included in a loading size configured for each group into the second memory 220, a second access pattern for loading nonconsecutive pages into the second memory 220, based on a page access pattern, a third access pattern for reclaiming a plurality of pages at once from the second memory 220, based on a page elimination pattern, and a fourth access pattern for loading consecutive pages into the second memory 220, based on the page access pattern, or a fifth access pattern for loading a plurality of pages included in a fixed loading size into the second memory 220. However, the memory access pattern is not limited to this example and may further include various memory access patterns. For example, a loading size may refer to the number (or size) of pages to be loaded into the second memory 220 together with a page (e.g., an offset) to which access is requested by the processor 200.

According to various embodiments, the processor 200 may store information related to the memory access pattern related to the file configured based on the result of monitoring the first memory 210 as metadata of the file.

According to various embodiments, the processor 200 may load at least part of the file stored in the first memory 210 into the second memory 220, based on the memory access pattern related to the file configured based on the result of monitoring the first memory 210.

According to an embodiment, when the application program executed in the processor 200 requires a first page of the first file, the processor 200 may identify whether the first page of the first file exists in the second memory 220. When the first page of the first file does not exist in the second memory 220, the processor 200 may identify at least one memory access pattern related to the first page. The processor 200 may load (or prefetch) at least one page including the first page from the first memory 210 into the second memory 220, based on the at least one memory access pattern related to the first page. The processor 200 may process the first page loaded into the second memory 220.

Figure 3:
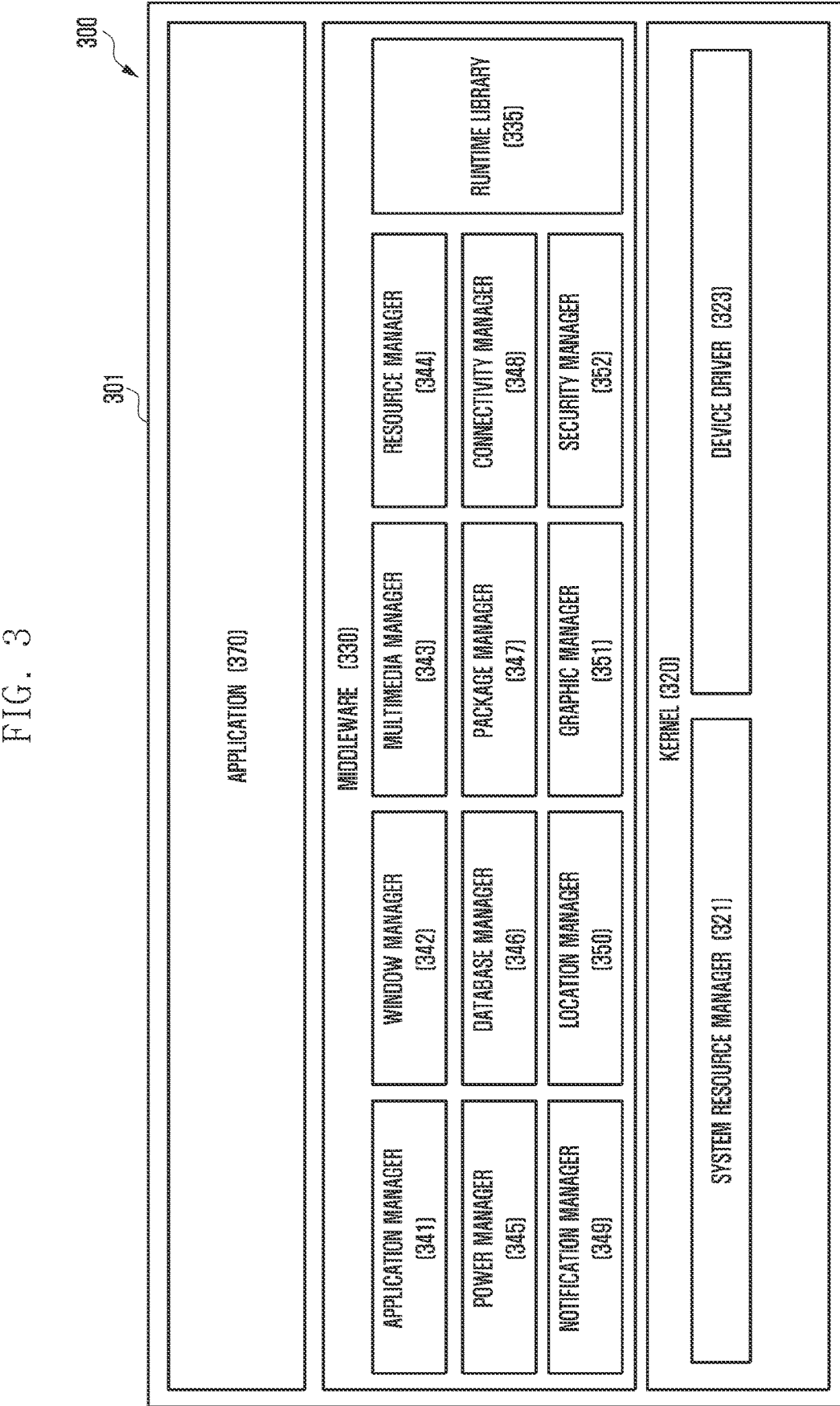
FIG. 3 is a block diagram illustrating an example configuration of a program according to various embodiments.

FIG. 3 is a block diagram 300 illustrating an example configuration of a program according to various embodiments. According to an embodiment, the program 301 of FIG. 3 may be a program (e.g., the program 140 of FIG. 1) on a memory (e.g., the memory 130 of FIG. 1, or the first memory 210 or the second memory 220 of FIG. 2) and may be executed by a processor (e.g., the processor 120 of FIG. 1 or the processor 200 of FIG. 2).

Referring to FIG. 3, according to various embodiments, the program 301 may include a kernel 320 (e.g., the operating system 142 of FIG. 1), middleware 330 (e.g., the middleware 144 of FIG. 1), and/or an application 370 (e.g., the application 146 of FIG. 1). For example, the operating system 142 may include, for example, Android™, iOS™, Windows™, Symbian™, Tizen™, or Bada™. For example, at least part of the program 301 may be preloaded onto an electronic device 300 at the time of manufacture, or may be downloaded or updated by a user from an external electronic device (e.g., the electronic device 102 or 104 or the server 108 of FIG. 1) at the time of use.

According to various embodiments, the kernel 320 may include a system resource manager 321 and/or a device driver 323. According to an embodiment, the system resource manager 321 may control, allocate, or recover a system resource. For example, the system resource manager 321 may include a process manager, a memory manager, or a file system manager. According to an embodiment, the memory manager may control storage, deletion, or update of data (or a page) related to the first memory 210 and/or the second memory 220 of FIG. 2.

According to various embodiments, the middleware 330 may provide a function commonly required by the application 370 or may provide various functions to the applications 370 so that the applications 370 can use limited system resources inside the electronic device. For example, the middleware 330 may include a least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

According to an embodiment, the runtime library 335 may include a library module used by a complier to add a new function through a programming language while the application 370 is running. The runtime library 335 may perform input/output management, memory management, or arithmetic function processing.

According to an embodiment, the application manager 341 may manage the life cycle of the application 370. The window manager 342 may manage a graphic user interface (GUI) resource used for a screen. The multimedia manager 343 may identify formats that are necessary to play media files, and may encrypt or decrypt a media file using a codec suitable for a corresponding format. The resource manager 344 may manage source code or memory space for the application 370. The power manager 345 may manage the capacity, temperature, or power supply of a battery and may determine or provide relevant information necessary for the operation of the electronic device 300 using corresponding information about the capacity, temperature, or power supply. According to an embodiment, the power manager 345 may interwork with a basic input/output system (BIOS, not shown).

According to an embodiment, the database manager 346 may generate, retrieve, or change a database to be used for the application 370. The package manager 347 may manage the installation or updating of an application distributed in the form of a package file. The connectivity manager 348 may manage wireless connectivity or direct connectivity between the electronic device 300 and the external electronic device. The notification manager 349 may provide a function of notifying a user of occurrence of a specified event (e.g., an incoming call, a message, or an alarm). The location manager 350 may manage location information about the electronic device 300. The graphic manager 351 may manage a graphic effect to be provided for the user or a user interface related to the graphic effect. The security manager 352 may provide system security or user authentication.

According to an embodiment, the middleware 330 may dynamically delete some of the existing components or may add new components. According to an embodiment, at least part of the middleware 330 may be included as a part of the kernel 320 (or operating system) or may be configured as software separate from the kernel 320 (or operating system). According to an embodiment, the middleware 330 may include an application programming interface (API). For example, the API may include an interface that controls to perform all or at least some operations of the program 301.

According to various embodiments, the application 370 may include a home screen, a dialer, a short message service (SMS)/multimedia message service (MMS), an instant messaging (IM), a browser, a camera, an alarm, an address book, a voice dialer, an email, a calendar, a media player, an album, a clock, a healthcare application (e.g., for measuring biometric information, such as exercising or blood sugar), or an environmental information application (e.g., for measuring atmospheric pressure, humidity, or temperature information).

According to various embodiments, the program 301 may further include a monitoring program for monitoring access to a file stored in the first memory 210 and/or a memory management program for configuring a memory access pattern related to the file, based on the result of monitoring the monitoring program. According to an embodiment, the monitoring program may be executed by the processor 200 to monitor the access to the file stored in the first memory 210. For example, the processor 200 may monitor the access to the file stored in the first memory 210, based on the monitoring program. According to an embodiment, the memory management program may configure at least one memory access pattern suitable for each part of a file to be used by the application program 370, based on a monitoring result detected based on the monitoring program. For example, the memory management program may configure a first memory access pattern for a first group that is at least a part of the file required by the application program 370, based on the monitoring result detected based on the monitoring program. The memory management program may configure a second memory access pattern for a second group, which is different from the first group, in the file required by the application program 370, based on the monitoring result detected based on the monitoring program. For example, the first memory access pattern may include a memory access pattern that is the same as or different from the second memory access pattern. For example, the memory management program may be executed by the processor 200 to configure a memory access pattern corresponding to a part of a file. For example, the program 301 may include the monitoring program and/or the memory management program in the form of the kernel 320 (e.g., the operating system), the middleware 330 (e.g., the API), or the application 370.

According to various example embodiments, an electronic device (e.g., the electronic device 101 of FIG. 1 or FIG. 2) may include: a first memory (e.g., the memory 130 of FIG. 1 or the first memory 210 of FIG. 2) configured to store data related to a file, a second memory (e.g., the memory 130 of FIG. 1 or the second memory 220 of FIG. 2) configured to temporarily store at least part of the data related to the file, and a processor (e.g., the processor 120 of FIG. 1 or the processor 200 of FIG. 2) operatively connected to the first memory and the second memory, wherein the processor may be configured to: monitor access to the data related to the file stored in the first memory for a specified time based on performing of an application program, configure a first access pattern for a first group including the at least part of the data related to the file stored in the first memory based on a monitoring result, and load data of the first group related to the file stored in the first memory into the second memory based on the first access pattern, based on the application program requesting access to the data included in the first group.

According to various example embodiments, the access pattern may include at least one of an access pattern for loading at least one page included in a loading size configured for each group into the second memory, an access pattern for loading nonconsecutive pages into the second memory based on a page access pattern, an access pattern for reclaiming a plurality of pages at once from the second memory based on a page reclamation pattern, an access pattern for loading consecutive pages into the second memory based on the page access pattern, or an access pattern for loading a plurality of pages included in a fixed loading size into the second memory.

According to various example embodiments, the processor may be configured to configure an access pattern for a second group, different from the first group, among the data related to the file stored in the first memory as a second access pattern based on the monitoring result.

According to various example embodiments, the second access pattern may include an access pattern that is the same as or different from the first access pattern.

According to various example embodiments, the processor may be configured to: determine whether to monitor the access to the data related to the file stored in the first memory based on a load of the processor and a load of the second memory, and monitor the access to the data related to the file stored in the first memory for the specified time based on determining to monitor the access to the data related to the file.

According to various example embodiments, the processor may be configured to: monitor the access to the data related to the file stored in the first memory based on the first access pattern being configured for the first group, and configure a third access pattern for a third group including at least part of the data related to the file based on the monitoring result, based on determining that an error occurs in the first access pattern based on the monitoring result, and wherein the third group may be the same as the first group or includes at least part of the first group.

According to various example embodiments, the processor may be configured to: determine that the error occurs in the first access pattern based on a number of accesses to the data included in the first group among the data related to the file stored in the first memory satisfying a specified condition.

According to various example embodiments, the processor may be configured to: monitor the access to the data related to the file stored in the first memory based on the first access pattern being configured for the first group, and configure a fourth access pattern for a fourth group including at least part of the data related to the file based on the monitoring result based on a structure of the file being changed.

According to various example embodiments, the processor may be configured to: determine that the structure of the file is changed based on new data being added to the file stored in the first memory, the file stored in the first memory being deleted, or at least part of the file stored in the first memory being updated.

According to various example embodiments, the first memory may include a nonvolatile memory, and the second memory may include a volatile memory.

Figure 4:
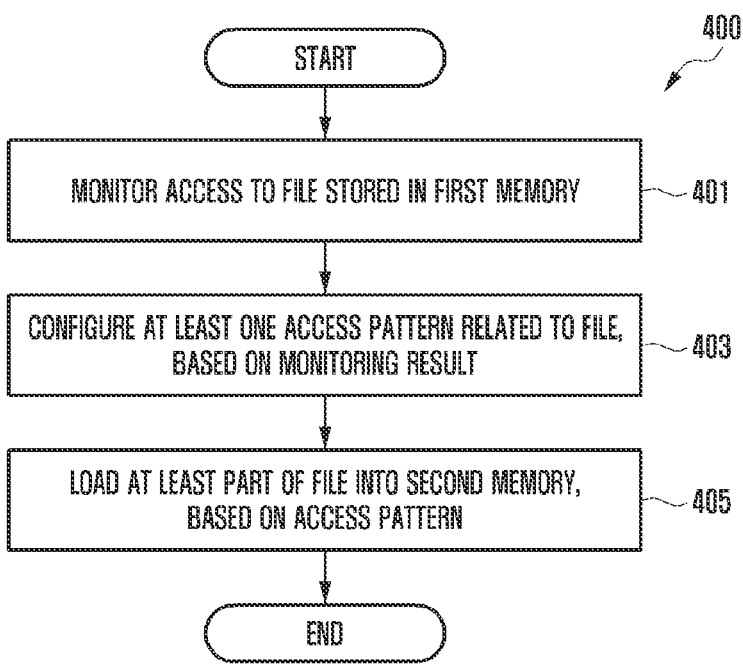
FIG. 4 is a flowchart illustrating an example of configuring a memory access pattern in an electronic device according to various embodiments.

FIG. 4 is a flowchart 400 illustrating an example of configuring a memory access pattern in an electronic device according to various embodiments. In the following embodiments, operations may be sequentially performed but are not necessarily sequentially performed. For example, the order of the operations may be changed, and at least two operations may be performed in parallel. In one example, the electronic device of FIG. 4 may be the electronic device 101 of FIG. 1 or FIG. 2.

According to various embodiments with reference to FIG. 4, in operation 401, the electronic device (e.g., the processor 120 of FIG. 1 or the processor 200 of FIG. 2) may monitor access to a file stored in a first memory (e.g., the first memory 210 of FIG. 2). According to an embodiment, when an application program requires a first file, the processor 200 may identify an offset of a page to which access occurs among a plurality of pages forming the first file stored in the first memory 210 and/or information about a time when the access occurs through monitoring of the first memory 210. According to an embodiment, the processor 200 may selectively monitor the first memory 210, based on the load of the processor 200 and/or the load of a second memory 220. For example, when the load of the processor 200 satisfies a specified first condition and the load of the second memory 220 satisfies a specified second condition, the processor 200 may monitor the first memory 210. For example, a state of satisfying the specified first condition may include a state in which the usage level of the processor 200 is less than or equal to a predefined reference usage level. For example, a state of satisfying the specified second condition may include a state in which the size of available space of the second memory 220 exceeds a predefined reference memory size.

According to various embodiments, in operation 403, the electronic device (e.g., the processor 120 or 200) may configure at least one memory access pattern related to the file based on the result of monitoring the first memory (e.g., the first memory 210 of FIG. 2). According to an embodiment, the processor 200 may identify at least pattern for loading at least one page included in the first file stored in the first memory 210 into the second memory 220, based on the result of monitoring the first memory 210. For example, the at least one pattern may include information related to the order of pages loaded from the first memory 210 to the second memory 220 for a specified time, based on a request by the application program. The processor 200 may divide the pages included in the first file into at least one group, based on the at least one pattern, and may configure at least one memory access pattern suitable for each group.

According to various embodiments, in operation 405, the electronic device (e.g., the processor 120 or 200) may load (or prefetch) at least part of the file stored in the first memory (e.g., the first memory 210 of FIG. 2) into the second memory (e.g., the second memory 220 of FIG. 2), based on the at least one memory access pattern related to the file, configured based on the result of monitoring the first memory (e.g., the first memory 210 of FIG. 2). According to an embodiment, when the application program executed in the processor 200 requests a first page of the first file, the processor 200 may identify whether the first page of the first file exists in the second memory 220. When the first page of the first file does not exist in the second memory 220, the processor 200 may identify at least one memory access pattern related to the first page configured based on the result of monitoring the first memory 210. The processor 200 may load (or prefetch) at least one page including the first page from the first memory 210 to the second memory 220, based on the at least one memory access pattern related to the first page.

According to various embodiments, when a memory access pattern generation event occurs, the electronic device 101 may configure at least one memory access pattern related to the file, based on the result of monitoring the first memory 210. According to an embodiment, when the size of monitoring information (e.g., a log) collected through monitoring related to the first file satisfies a second reference size, the processor 200 may determine that a memory access pattern generation event occurs. According to an embodiment, when it is determined that an error occurs in the memory access pattern used to load at least one page (e.g., data) related to the first file into the second memory 220, the processor 200 may determine that a memory access pattern generation event occurs. For example, a state of determining that the error occurs in the memory access pattern may include a state in which the number of requests for the page (e.g., the data) to the monitored first memory 210 for a specified time exceeds a reference number. According to an embodiment, when the structure of the first file is changed, the processor 200 may determine that a memory access pattern generation event occurs. For example, changing the structure of the first file may include a series of operations of adding new data to the first file, or deleting or changing at least part of data included in the first file.

Figure 5:
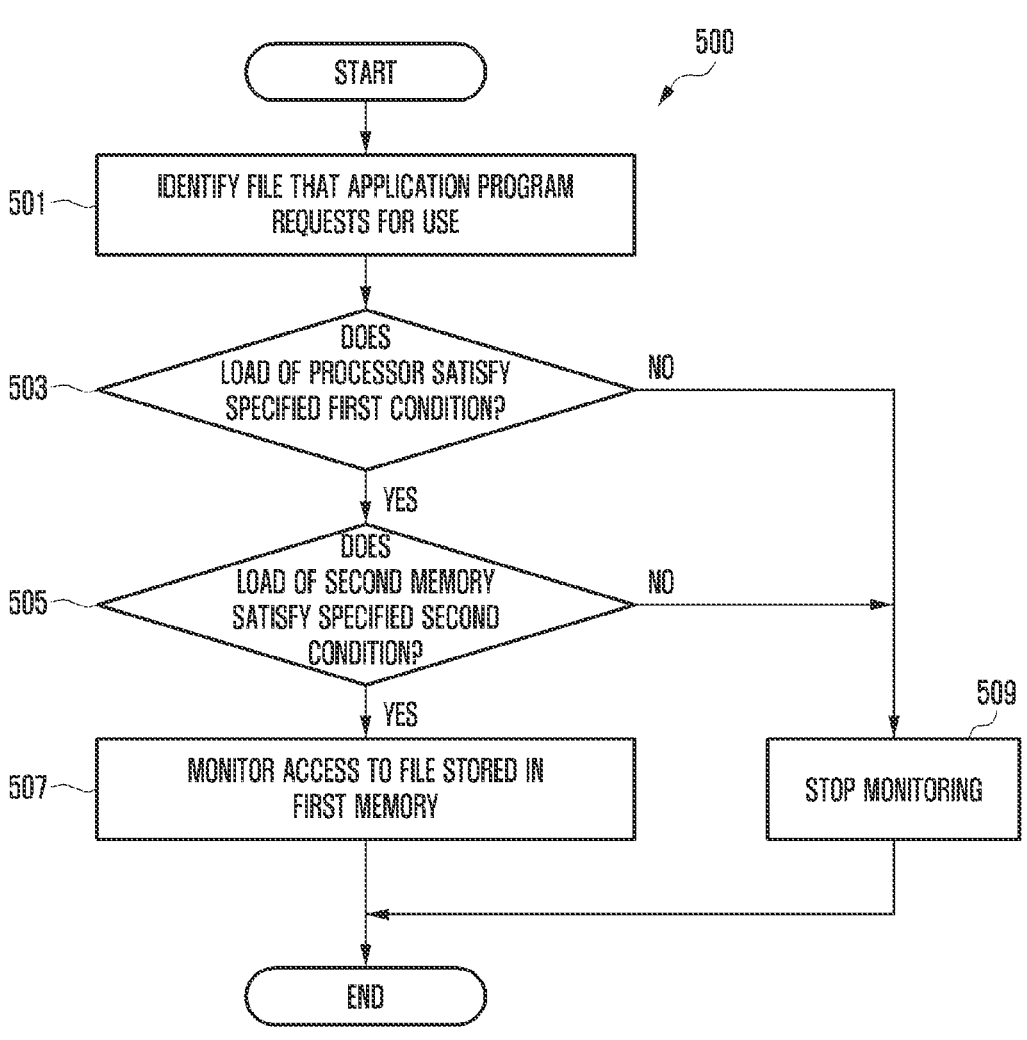
FIG. 5 is a flowchart illustrating an example of monitoring a storage by an electronic device according to various embodiments.

FIG. 5 is a flowchart 500 illustrating an example of monitoring a storage by an electronic device according to various embodiments. According to an embodiment, operations of FIG. 5 may include specific operations of operation 401 of FIG. 4. In the following embodiments, the operations may be sequentially performed but are not necessarily sequentially performed. For example, the order of the operations may be changed, and at least two operations may be performed in parallel. In one example, the electronic device of FIG. 5 may be the electronic device 101 of FIG. 1 or FIG. 2.

According to various embodiments with reference to FIG. 5, in operation 501, the electronic device (e.g., the processor 120 of FIG. 1 or the processor 200 of FIG. 2) may identify a file that an application program executed in the electronic device 101 requests for use.

According to various embodiments, in operation 503, the electronic device (e.g., the processor 120 or 200) may identify whether the load of the processor (e.g., the processor 120 or 200) satisfies a specified first condition. According to an embodiment, when the usage level of the processor 200 is less than or equal to a predefined reference usage level, the processor 200 may determine that the load of the processor 200 satisfies the specified first condition. According to an embodiment, when the usage level of the processor 200 exceeds the predefined reference usage level, the processor 200 may determine that the load of the processor 200 does not satisfy the specified first condition.

According to various embodiments, when the load of the processor (e.g., the processor 120 or 200) satisfies the specified first condition (e.g., Yes in operation 503), the electronic device (e.g., the processor 120 or 200) may identify whether the load of a second memory (e.g., the second memory 220) satisfies a specified second condition in operation 505. According to an embodiment, when the size of available space of the second memory 220 exceeds a predefined reference memory size, the processor 200 may determine that the load of the second memory 220 satisfies the specified second condition. According to an embodiment, when the size of available space of the second memory 220 is less than or equal to the predefined reference memory size, the processor 200 may determine that the load of the second memory 220 does not satisfy the specified second condition.

According to various embodiments, when the load of the second memory (e.g., the second memory 220) satisfies the specified second condition (e.g., Yes in operation 505), the electronic device (e.g., the processor 120 or 200) may monitor access to a file stored in a first memory (e.g., the first memory 210 of FIG. 2) in operation 507. According to an embodiment, when the load of the processor 200 satisfies the specified first condition and the load of the second memory 220 satisfies the specified second condition, the electronic device (e.g., the processor 120 or 200) may monitor the access to the file stored in the first memory 210.

According to various embodiments, when the load of the processor (e.g., the processor 120 or 200) does not satisfy the specified first condition (e.g., No in operation 503) or the load of the second memory (e.g., the second memory 220) does not satisfy the specified second condition (e.g., No in operation 505), the processor 200 may restrict or stop monitoring of the first memory (e.g., the first memory 210 of FIG. 2) in operation 509.

According to various embodiments, when a time to monitor the first memory 210 arrives, the electronic device 101 may determine whether to perform the monitoring, based on the load of the processor 200 and/or the load of the second memory 220. For example, the time to monitor the first memory 210 may periodically arrive. In another example, the time to monitor the first memory 210 may include a time for the application program executed in the processor 200 to request the file stored in the first memory 210.

Figure 6:
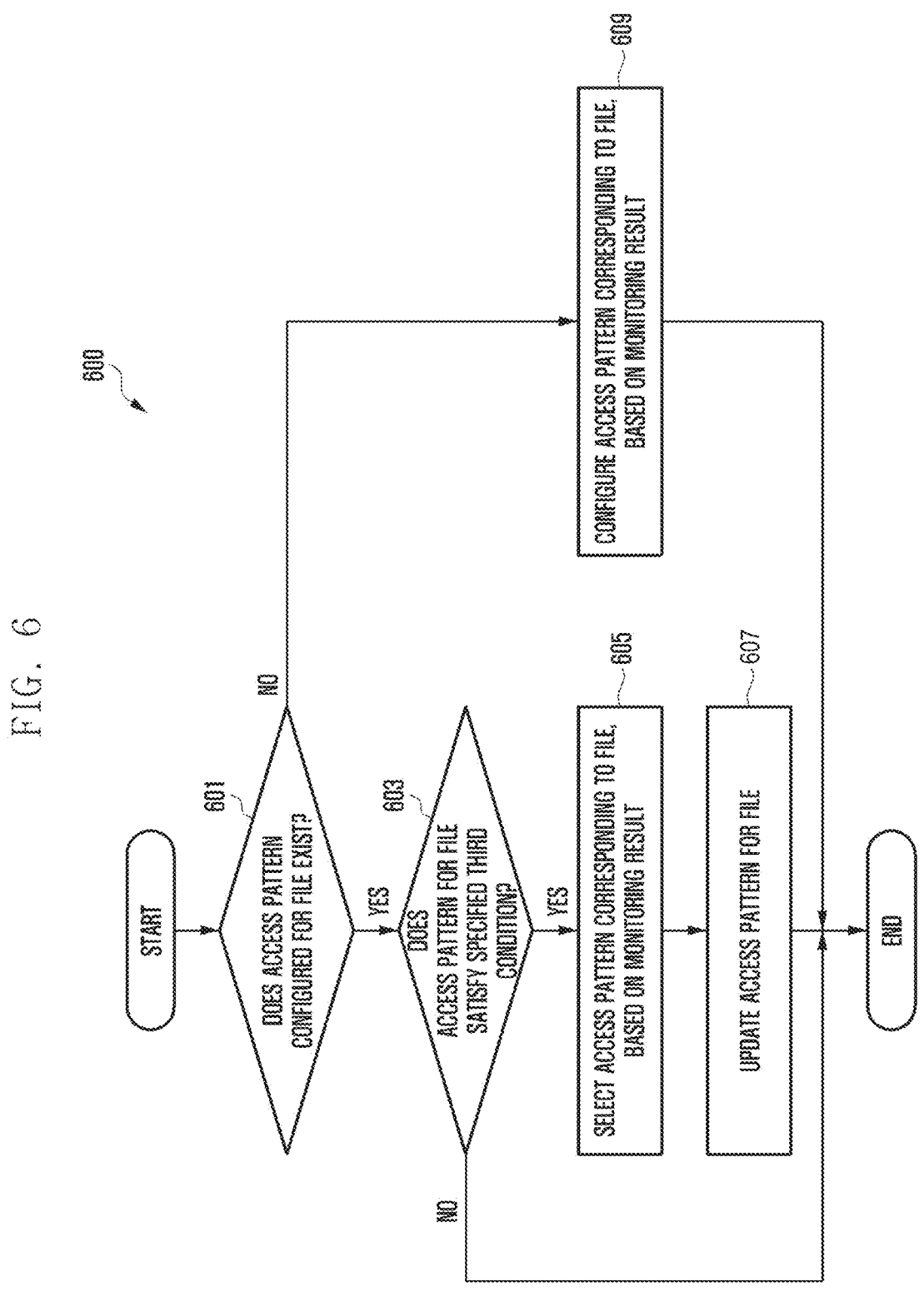
FIG. 6 is a flowchart illustrating an example of updating a memory access pattern in an electronic device according to various embodiments.

FIG. 6 is a flowchart 600 illustrating an example of updating a memory access pattern in an electronic device according to various embodiments. According to an embodiment, operations of FIG. 6 may include specific operations of operation 403 of FIG. 4. In the following embodiments, the operations may be sequentially performed but are not necessarily sequentially performed. For example, the order of the operations may be changed, and at least two operations may be performed in parallel. In one example, the electronic device of FIG. 6 may be the electronic device 101 of FIG. 1 or FIG. 2.

According to various embodiments with reference to FIG. 6, when monitoring access to a file stored in a first memory (e.g., the first memory 210 of FIG. 2) (e.g., operation 401 of FIG. 4), the electronic device (e.g., the processor 120 of FIG. 1 or the processor 200 of FIG. 2) may identify whether there is a memory access pattern configured for the file that an application program requests for use in operation 601.

According to various embodiments, when the memory access pattern configured for the file exists (e.g., Yes in operation 601), the electronic device (e.g., the processor 120 or 200) may identify whether the memory access pattern configured for the file satisfies a specified third condition in operation 603. According to an embodiment, when the number of requests for a page (e.g., data) to the first memory 210 monitored for a specified time exceeds a reference number, the processor 200 may determine that the memory access pattern configured for the file satisfies the third condition. For example, the number of requests for the page may include the number of times the processor 200 requests a page (e.g., data) of a first file required by the application program from the first memory 210 as the page (e.g., the data) of the first file required by the application program does not exist in a second memory 220. According to an embodiment, the number of requests for the page (e.g., the data) to the first memory 210 monitored for the specified time is less than or equal to the reference number, the processor 200 may determine that the memory access pattern configured for the file does not satisfy the specified third condition.

According to various embodiments, when the memory access pattern configured for the file does not satisfy the specified third condition (e.g., No in operation 603), the electronic device (e.g., the processor 120 or 200) may terminate the process for updating the memory access pattern. According to an embodiment, when the memory access pattern configured for the file does not satisfy the specified third condition, the processor 200 may determine that no error occurs in the memory access pattern used to load the page (e.g., the data) related to the file into the second memory 220. Accordingly, the processor 200 may load (or prefetch) at least part of the file stored in the first memory 210 into the second memory 220 continuously using the memory access pattern configured for the file.

According to various embodiments, when the memory access pattern configured for the file satisfies the specified third condition (e.g., Yes in operation 603), the electronic device (e.g., the processor 120 or 200) may select at least one memory access pattern related to the file from among a plurality of memory access patterns, based on the result of monitoring the first memory (e.g., the first memory 210 of FIG. 2) in operation 605. According to an embodiment, when the memory access pattern configured for the file satisfies the specified third condition, the processor 200 may determine that an error occurs in the memory access pattern used to load the page (e.g., the data) related to the file into the second memory 220. Accordingly, the processor 200 may configure at least one memory access pattern suitable for the file, based on the result of monitoring the first memory 210.

According to various embodiments, in operation 607, the electronic device (e.g., the processor 120 or 200) may update the memory access pattern for the file, based on the memory access pattern selected based on the result of monitoring the first memory (e.g., the first memory 210 of FIG. 2).

According to various embodiments, when there is no memory access pattern configure for the file (e.g., No in operation 601), the electronic device (e.g., the processor 120 or 200) may configure at least one memory access pattern related to the file, based on the result of monitoring the first memory (e.g., the first memory 210 of FIG. 2) in operation 609. According to an embodiment, the processor 200 may identify whether the size of monitoring information (e.g., a log) collected through monitoring related to the first file satisfies a second reference size. For example, when the size of the monitoring information (e.g., the log) collected through the monitoring related to the first file satisfies the second reference size, the processor 200 may configure at least one memory access pattern suitable for the first file, based on the result of the monitoring related to the first file. For example, a state of satisfying the second reference size may include a state in which the size of the monitoring information (e.g., the log) collected through the monitoring related to the first file is equal to or greater than the second reference size.

According to various embodiments, the electronic device 101 may detect a time when at least part of the first file stored in the first memory 210 is stored in the second memory 220, based on a time when the at least part of the first file is loaded into the second memory 220, based on the result of monitoring the first memory 210, and a time when the at least part of the first file is reclaimed from the second memory. According to an embodiment, the processor 200 may obtain monitoring information illustrated in Table 1 through monitoring of the first file stored in the first memory 210.

TABLE 1

| Offset | Page fault time stamp | Page reclaim time stamp | Page fault count |
|---|---|---|---|
| 2 | 0 | 120 | 1 |
| 4 | 50 | 80 | 1 |
| 1 | 70 | 240 | 1 |
| 5 | 110 | 170 | 1 |
| 3 | 170 | 240 | 1 |

For example, in Table 1, an offset may indicate a position (or page) that is accessed by the processor 200 in the first file. A page fault time stamp may indicate a time when the page at the position accessed by the processor 200 is loaded into the second memory 220. A page reclaim time stamp may indicate a time when the page is reclaimed from the second memory 220. A page fault count may indicate the number of times a page fault has occurred. For example, a page fault is a series of operations that occur when an address of a physical memory corresponding to a virtual address of a memory does not exist, and the processor 200 may monitor an operation of accessing data stored in the first memory 210 (e.g. a major fault) by a page fault.

According to an embodiment, the processor 200 may analyze the monitoring information illustrated in Table 1, thereby detecting a time when the page of the first file is stored in the second memory 220 as shown in Table 2.

TABLE 2

| Offset | Average lifespan | Page fault count |
|---|---|---|
| 1 | 170 | 1 |
| 2 | 120 | 1 |
| 3 | 70 | 1 |
| 5 | 60 | 1 |
| 4 | 30 | 1 |

According to an embodiment, the processor 200 may arrange pages in which a page fault occurs at a specified time interval, based on the page fault count of the page of the first file and/or the time in which the page is stored in the second memory 220 in Table 3.

TABLE 3

| Interval | Offset | Page fault time stamp |
|---|---|---|
| First interval | 876 | 1560 |
| | 901 | 1560 |
| | 676 | 1570 |
| | 1024 | 1570 |
| | 515 | 1580 |
| | . . . | |
| Second interval | 876 | 5680 |
| | 6656 | 5690 |
| | 301 | 5690 |
| | 1024 | 5710 |
| | 98 | 5800 |
| | . . . | |
| Third interval | 876 | 9840 |
| | 1544 | 9860 |
| | 1024 | 9860 |
| | 115 | 9880 |
| | 986 | 10010 |
| | . . . | |

Through Table 3, the processor 200 may determine that there is a relatively high probability that a page corresponding to an offset "1024" additionally experiences a page fault after a page corresponding to an offset "876" experiences a page fault. In this case, the processor 300 may configure the page corresponding to the offset "876" and the page corresponding to the offset "1024" among a plurality of pages forming the first file as one group to which a second access pattern is applied. For example, when the application program requests the page corresponding to the offset "876", the processor 200 may prefetch the page corresponding to the offset "1024", along with the page corresponding to the offset "876", among the pages of the first file stored in the first memory 210 into the second memory 220.

According to various embodiments, the electronic device 101 may configure a third access pattern, based on a relation between pages included in the first file, based on the result of monitoring the first memory 210. According to an embodiment, when the page corresponding to the offset "876" included in the first file experiences a page fault, based on the result of monitoring the first memory 210, the processor 200 may identify page fault information about a different page prefetched into the second memory 220 as shown in Table 4.

TABLE 4

| Offset | Page fault information | Information about page fault within specified time | Relevant information |
|---|---|---|---|
| 5 | 48 | 31 | 0.65 |
| 164 | 17 | 11 | 0.65 |
| 1024 | 96 | 90 | 0.94 |

TABLE 4-continued

| Offset | Page fault information | Information about page fault within specified time | Relevant information |
|--------|----------------------|---------------------------------------------------|---------------------|
| 1855 | 84 | 78 | 0.93 |
| 1946 | 102 | 11 | 0.11 |
| 2431 | 12 | 9 | 0.75 |

For example, a probability that a page corresponding to an offset "5" and a page corresponding to an offset "164" included in the first file experience a page fault within a specified time (e.g., about 10 ms) after the page corresponding to the offset "876" experiences a page fault may be determined to be approximately 65%. A probability that a page corresponding to an offset "1024" included in the first file experiences a page fault within the specified time (e.g., about 10 ms) after the page corresponding to the offset "876" experiences a page fault may be determined to be approximately 94%. A probability that a page corresponding to an offset "1855" included in the first file experiences a page fault within the specified time (e.g., about 10 ms) after the page corresponding to the offset "876" experiences a page fault may be determined to be approximately 93%. A probability that a page corresponding to an offset "1946" included in the first file experiences a page fault within the specified time (e.g., about 10 ms) after the page corresponding to the offset "876" experiences a page fault may be determined to be approximately 11%. A probability that a page corresponding to an offset "2431" included in the first file experiences a page fault within the specified time (e.g., about 10 ms) after the page corresponding to the offset "876" experiences a page fault may be determined to be approximately 75%.

According to an embodiment, the processor 200 may determine that the pages corresponding to the offsets "1024", "1855", and "2431" have a relatively high relation to the page corresponding to the offset "876", based on Table 4. In this case, the processor 300 may configure the pages corresponding to the offsets "876", "1024", "1855", and "2431" among a plurality of pages forming the first file as one group to which the third access pattern is applied. For example, when the page corresponding to the offset "876" is reclaimed from the second memory 220, the processor 200 may also reclaim the pages corresponding to the offsets "1024", "1855", and "2431" from the second memory 220. In one example, the page corresponding to the offset "876" may be reclaimed when access of the processor 200 to the page corresponding to the offset "876" stored in the second memory 220 does not occur within a specified time. In another example, the page corresponding to the offset "876" may be reclaimed when the application processor requests reclamation of the page corresponding to the offset "876".

Figure 7:
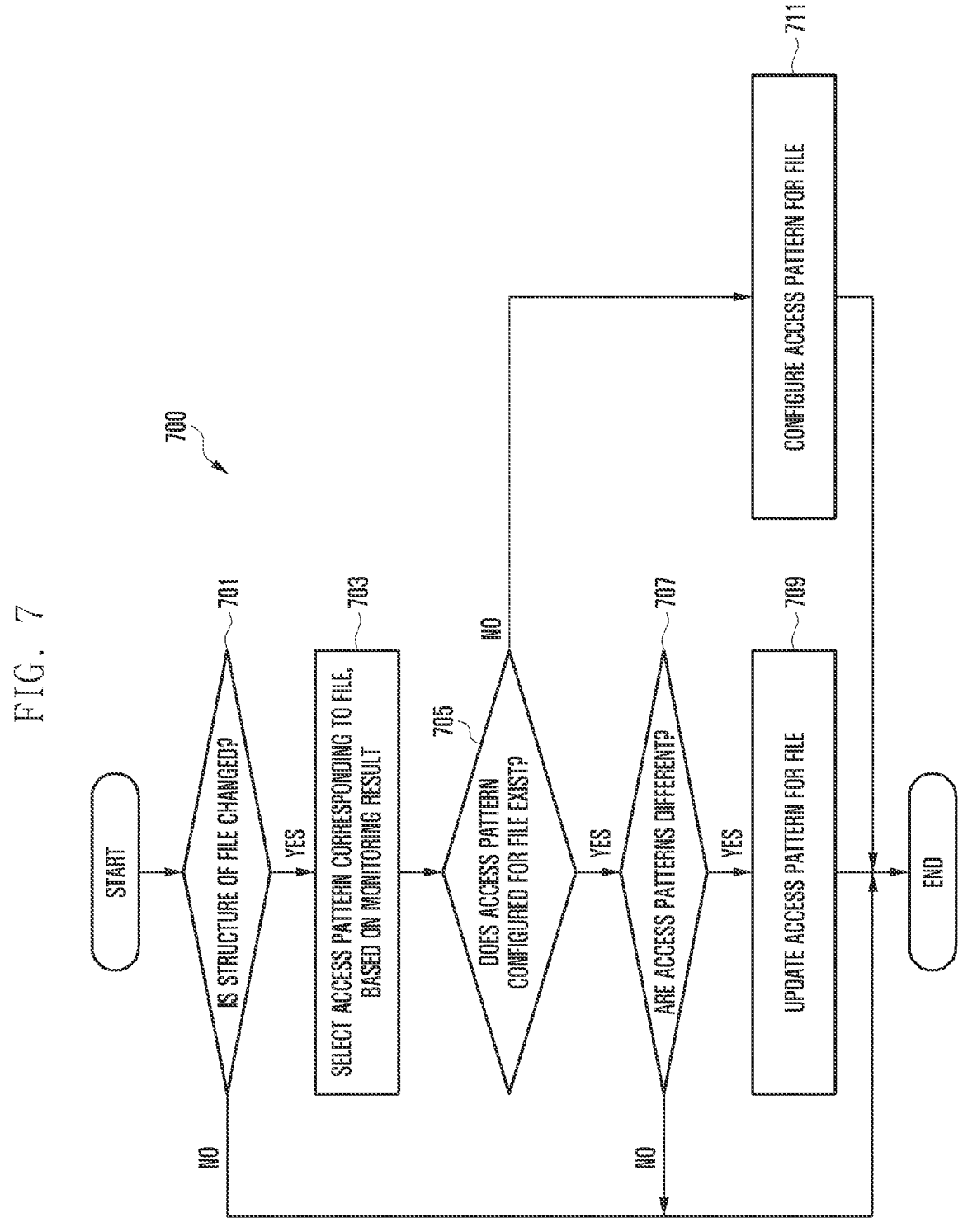
FIG. 7 is a flowchart illustrating an example of updating a memory access pattern in an electronic device according to various embodiments.

FIG. 7 is a flowchart 700 illustrating an example of updating a memory access pattern in an electronic device according to various embodiments. According to an embodiment, operations of FIG. 7 may include specific operations of operation 403 of FIG. 4. In the following embodiments, the operations may be sequentially performed but are not necessarily sequentially performed. For example, the order of the operations may be changed, and at least two operations may be performed in parallel. In one example, the electronic device of FIG. 7 may be the electronic device 101 of FIG. 1 or FIG. 2.

According to various embodiments with reference to FIG. 7, when monitoring access to a file stored in a first memory (e.g., the first memory 210 of FIG. 2) (e.g., operation 401 of FIG. 4), the electronic device (e.g., the processor 120 of FIG. 1 or the processor 200 of FIG. 2) may identify whether the structure of the file stored in the first memory (e.g., the first memory 210 of FIG. 2) is changed in operation 701. For example, changing the structure of the file may include a series of operations of adding new data to the file, or deleting or changing at least part of data included in the file.

According to various embodiments, when the structure of the file is not changed (e.g., No in operation 701), the electronic device (e.g., the processor 120 or 200) may terminate the updating of a memory access pattern.

According to various embodiments, when the structure of the file is changed (e.g., Yes in operation 701), the electronic device (e.g., the processor 120 or 200) may select at least one memory access pattern related to the file from among a plurality of memory access patterns, based on the result of monitoring the first memory (e.g., the first memory 210 of FIG. 2), in operation 703. According to an embodiment, the processor 200 may identify whether the size of monitoring information (e.g., a log) collected through monitoring related to a first file satisfies a second reference size. For example, when the size of the monitoring information (e.g., the log) collected through the monitoring related to the first file satisfies the second reference size, the processor 200 may configure at least one memory access pattern suitable for the first file, based on the result of the monitoring related to the first file. For example, a state of satisfying the second reference size may include a state in which the size of the monitoring information (e.g., the log) collected through the monitoring related to the first file is equal to or greater than the second reference size.

According to various embodiments, in operation 705, the electronic device (e.g., the processor 120 or 200) may identify whether there is a memory access pattern configured for the file that an application program requests for use.

According to various embodiments, when the memory access pattern configured for the file exists (e.g., Yes in operation 705), the electronic device (e.g., the processor 120 or 200) may identify whether the memory access pattern configured for the file is different from the memory access pattern selected based on the monitoring result in operation 707.

According to various embodiments, when the memory access pattern configured for the file and the memory access pattern selected based on the monitoring result are the same (e.g., No in operation 707), the electronic device (e.g., the processor 120 or 200) may terminate the updating of the memory access pattern.

According to various embodiments, when the memory access pattern configured for the file is different from the memory access pattern selected based on the monitoring result are the same (e.g., Yes in operation 707), the electronic device (e.g., the processor 120 or 200) may update the memory access pattern for the file, based on the memory access pattern selected based on the result of monitoring the first memory (e.g., the first memory 210 of FIG. 2), in operation 709.

According to various embodiments, when there is no memory access pattern configured for the file (e.g., No in operation 705), the electronic device (e.g., the processor 120 or 200) may configure the memory access pattern selected based on the result of monitoring the first memory (e.g., the first memory 210 of FIG. 2) as a memory access pattern for at least part of the file in operation 711.

According to various embodiments, the electronic device 101 may configure a fourth access pattern, based on the result of monitoring the first memory 210. According to an embodiment, the processor 200 may identify page fault information about pages included in the first file, based on the result of monitoring the first memory 210 as shown in Table 5.

TABLE 5

| Offset | Page fault time stamp |
|--------|----------------------|
| 543 | 1520 |
| 131 | 1530 |
| 132 | 1540 |
| 133 | 1550 |
| 134 | 1560 |
| 135 | 1570 |

According to an embodiment, the processor 200 may determine that page faults of pages corresponding to offsets "131", "132", "133", "134", and "135" consecutively occur at regular intervals, based on Table 5. In this case, the processor 300 may configure the pages corresponding to the offsets "131", "132", "133", "134", and "135" from among a plurality of pages forming the first file as one group to which the fourth access pattern is applied. For example, when the application program requests the page corresponding to the offset "131", the processor 200 may prefetch the pages corresponding to the offsets "132", "133", "134", and "135", along with the page corresponding to the offset "131", among the pages of the first file stored in the first memory 210 into the second memory 220.

Figure 8:
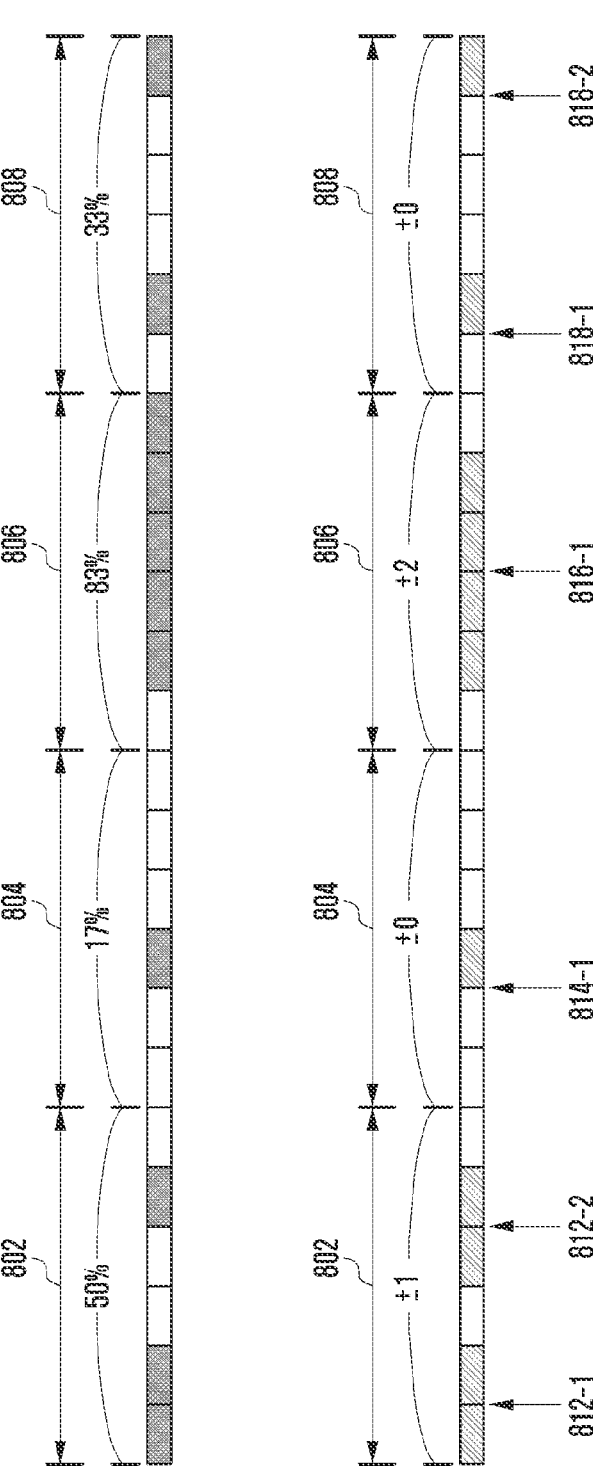
FIG. 8 is a diagram illustrating an example of configuring a loading size for a first access pattern in an electronic device according to various embodiments.

FIG. 8 is a diagram illustrating an example of configuring a loading size for a first access pattern in an electronic device according to various embodiments.

According to various embodiments with reference to FIG. 8, the electronic device 101 may configure the first access pattern, based on the page usage rate of a first file stored in a first memory 210. According to an embodiment, a processor 200 may divide the first file stored in the first memory 210 into a plurality of areas 802, 804, 806, and 808. The processor 200 may identify the paging fault rate of a page included in each area for a specified time. For example, when the paging fault rate of a first area 802 is about 50%, the processor 200 may configure the loading size of the first area 802 to ±1. For example, when the paging fault rate of a second area 804 is about 17%, the processor 200 may configure the loading size of the second area 804 to 0. For example, when the paging fault rate of a third area 806 is about 83%, the processor 200 may configure the loading size of the third area 806 to ±2. For example, when the paging fault rate of a fourth area 808 is about 33%, the processor 200 may configure the loading size of the fourth area 808 to 0.

According to an embodiment, when an application program requests a page 812-1 of a first offset of the first area 802, the processor 200 may prefetch, along with the page 812-1 of the first offset, a page that is one page before the page 812-1 of the first offset among pages of the first file stored in the first memory 210 into a second memory 220. According to an embodiment, when the application program requests a page 812-2 of a second offset of the first area 802, the processor 200 may prefetch, along with the page 812-2 of the second offset, one page before the page 812-2 of the second offset among the pages of the first file stored in the first memory 210 into the second memory 220.

According to an embodiment, when the application program requests a page 814-1 of a third offset of the second area 804, the processor 200 may prefetch the page 814-1 of the third offset among the pages of the first file stored in the first memory 210 into the second memory 220.

According to an embodiment, when the application program requests a page 816-1 of a fourth offset of the third area 806, the processor 200 may prefetch, along with the page 816-1 of the fourth offset, two pages before the page 816-1 of the fourth offset and one page disposed after the page 816-1 of the fourth offset among the pages of the first file stored in the first memory 210 into the second memory 220.

According to an embodiment, when the application program requests a page 818-1 of a fifth offset of the fourth area 808, the processor 200 may prefetch the page 818-1 of the fifth offset among the pages of the first file stored in the first memory 210 into a second memory 220. According to an embodiment, when the application program requests a page 818-2 of a sixth offset of the fourth area 808, the processor 200 may prefetch the page 818-2 of the sixth offset among the pages of the first file stored in the first memory 210 into a second memory 220.

Figure 9:
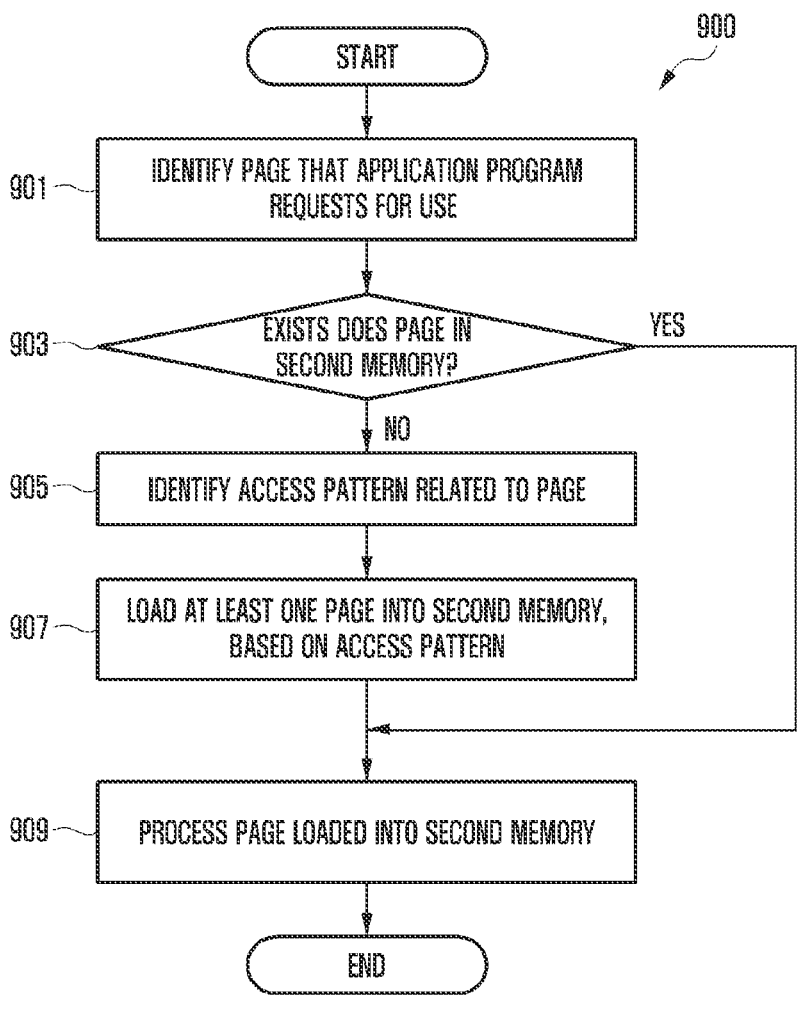
FIG. 9 is a flowchart illustrating an example of loading data into a main memory, based on a memory access pattern, in an electronic device according to various embodiments.
Figure 10A:
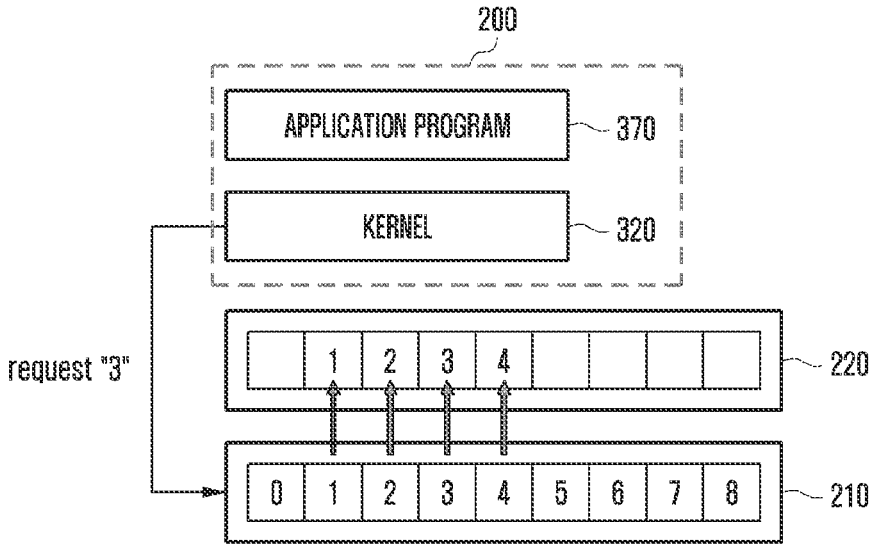
FIG. 10A is a diagram illustrating an example of loading data into a main memory, based on a first access pattern, in an electronic device according to various embodiments.
Figure 10B:
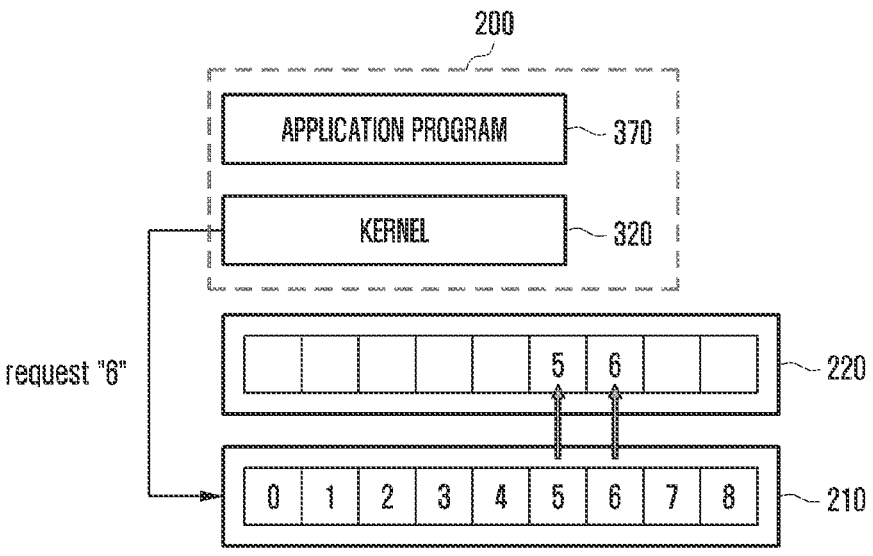
FIG. 10B is a diagram illustrating an example of loading data into a main memory, based on a first access pattern, in an electronic device according to various embodiments.
Figure 11A:
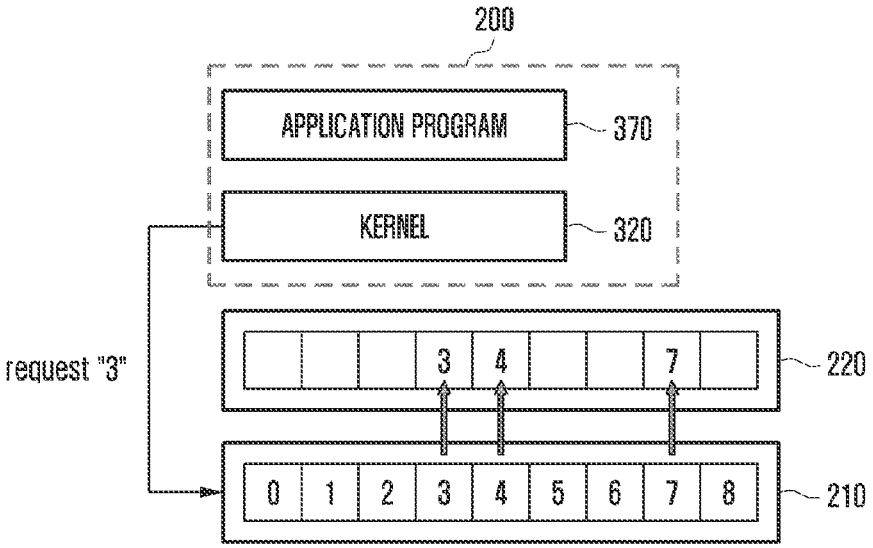
FIG. 11A is a diagram illustrating an example of loading data into a main memory, based on a second access pattern, in an electronic device according to various embodiments.
Figure 11B:
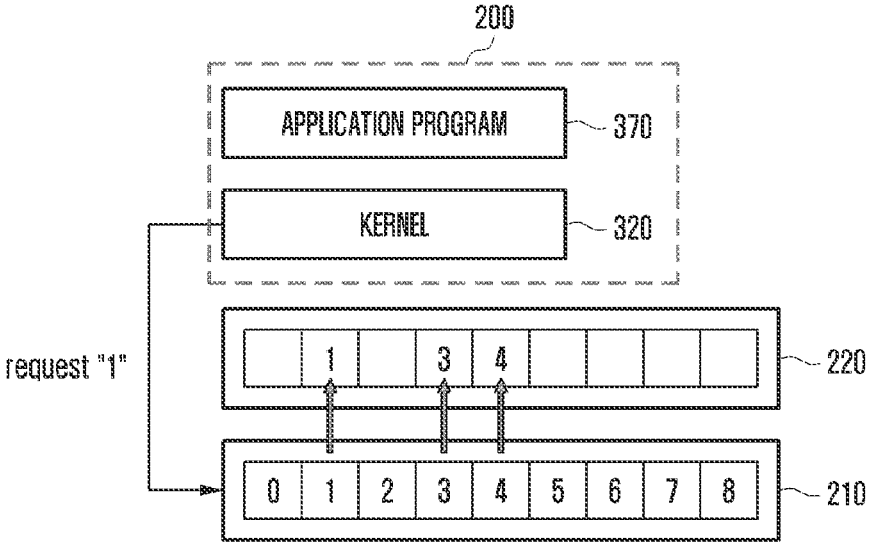
FIG. 11B is a diagram illustrating an example of loading data into a main memory, based on a second access pattern, in an electronic device according to various embodiments.

FIG. 9 is a flowchart 900 illustrating an example of loading data into a main memory, based on a memory access pattern, in an electronic device according to various embodiments. According to an embodiment, operations of FIG. 9 may include specific operations of operation 405 of FIG. 4. In the following embodiments, the operations may be sequentially performed but are not necessarily sequentially performed. For example, the order of the operations may be changed, and at least two operations may be performed in parallel. In an example, the electronic device of FIG. 9 may be the electronic device 101 of FIG. 1 or FIG. 2. In an example, at least part of FIG. 9 may be described with reference to FIG. 10A, FIG. 10B, FIG. 11A, and FIG. 11B. FIG. 10A and FIG. 10B are diagrams illustrating an example of loading data into a main memory, based on a first access pattern, in an electronic device according to various embodiments. FIG. 11A and FIG. 11B are diagrams illustrating an example of loading data into a main memory, based on a second access pattern, in an electronic device according to various embodiments.

According to various embodiments with reference to FIG. 9, when at least one memory access pattern related to a file is configured based on the result of monitoring a first memory (e.g., the first memory 210 of FIG. 2) (e.g., operation 403 of FIG. 4), the electronic device (e.g., the processor 120 of FIG. 1 or the processor 200 of FIG. 2) may identify a page of a first file that an application program executed in the electronic device 101 requests for use in operation 901.

According to various embodiments, in operation 903, the electronic device (e.g., the processor 120 or 200) may identify whether there is the page of the first file that the application program requests for use in a second memory (e.g., the second memory 220 of FIG. 2).

According to various embodiments, when the page of the first file that the application program requests for use exists in the second memory (e.g., the second memory 220 of FIG. 2) (e.g., Yes in operation 903), the electronic device (e.g., the processor 120 or 200) may terminate the process for loading the data into the main memory, based on the memory access pattern.

According to various embodiments, when the page of the first file that the application program requests for use does not exist in the second memory (e.g., the second memory 220 of FIG. 2) (e.g., No in operation 903), the electronic device (e.g., the processor 120 or 200) may identify a memory access pattern related to the page of the first file in operation 905.

According to various embodiments, in operation 907, the electronic device (e.g., the processor 120 or 200) may load (or prefetch) at least one page related to the first file stored in the first memory (e.g., the first memory 210) into the second memory (e.g., the second memory 220), based on the memory access pattern related to the page of the first file. According to an embodiment, when the application program executed in the processor 200 requests page 3, the processor 200 may identify a memory access pattern configured for page 3. When a first access pattern for which a loading size is configured to ±2 is configured for page 3, the processor 200 may prefetch, along with page 3, page 1 and page 2 before page 3 and page 4 disposed after page 3 among a plurality of pages related to the first file stored in the first memory 210 into the second memory 220 as shown in FIG. 10A.

According to an embodiment, when the application program executed in the processor 200 requests page 6, the processor 200 may identify a memory access pattern configured for page 6. When the first access pattern for which the loading size is configured to ±1 is configured for page 6, the processor 200 may prefetch, along with page 6, page 5 before page 6 among the plurality of pages related to the first file stored in the first memory 210 into the second memory 220 as shown in FIG. 10B.

According to an embodiment, when the application program executed in the processor 200 requests page 3, the processor 200 may identify the memory access pattern configured for page 3. When a second access pattern is configured for page 3, the processor 200 may prefetch, along with page 3, page 4 and page 7 among the plurality of pages related to the first file stored in the first memory 210 into the second memory 220 as shown in FIG. 11A.

According to an embodiment, when the application program executed in the processor 200 requests page 1, the processor 200 may identify a memory access pattern configured for page 1. When the second access pattern is configured for page 1, the processor 200 may prefetch, along with page 1, page 3 and page 4 among the plurality of pages related to the first file stored in the first memory 210 into the memory 220 as shown in FIG. 11B.

According to various embodiments, in operation 909, the electronic device (e.g., the processor 120 or 200) may process at least one page loaded (or prefetched) into the second memory (e.g., the second memory 220). According to an embodiment, the processor 200 may process data corresponding to the page loaded into the second memory 220 through the application program.

Figure 12:
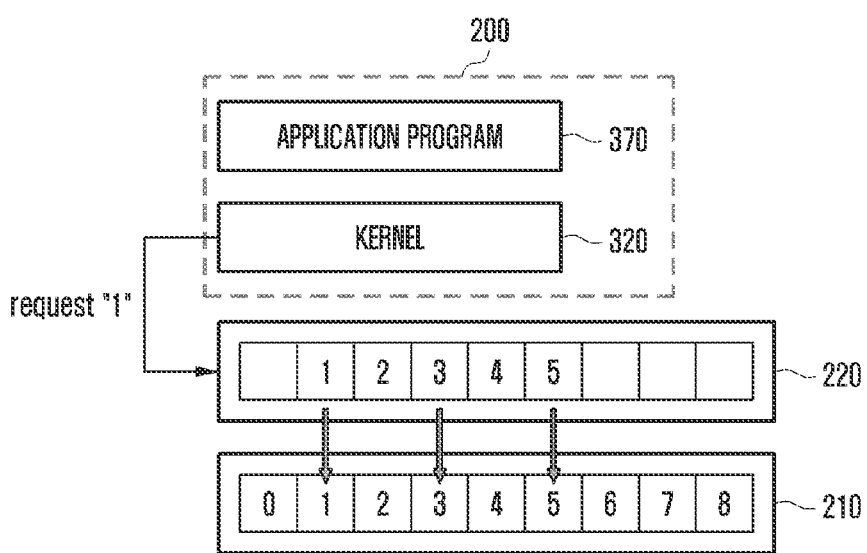
FIG. 12 is a diagram illustrating an example of reclaiming data from a main memory, based on a third access pattern, in an electronic device according to various embodiments.

FIG. 12 is a diagram illustrating an example of reclaiming data from a main memory, based on a third access pattern, in an electronic device according to various embodiments.

According to various embodiments with reference to FIG. 12, the electronic device 101 may configure the third access pattern for page 1 of a first file stored in a second memory 220. According to an embodiment, when page 1 is reclaimed from the second memory 220, the processor 200 may also reclaim page 3 and page 5 related to page 1 from the second memory 220. In one example, page 1 may be reclaimed when access of the processor 200 to page 1 stored in the second memory 220 does not occur within a specified time. In another example, page 1 may be reclaimed when the application processor requests reclamation of page 1.

According to various example embodiments, a method of operating an electronic device (e.g., the electronic device 101 of FIG. 1 or FIG. 2) including a first memory (e.g., the memory 130 of FIG. 1 or the first memory 210 of FIG. 2) configured to store data related to a file and a second memory (e.g., the memory 130 of FIG. 1 or the second memory 220 of FIG. 2) configured to temporarily store at least part of the data related to the file may include: monitoring access to the data related to the file stored in the first memory for a specified time based on performing of an application program, configuring a first access pattern for a first group including the at least part of the data related to the file stored in the first memory based on a monitoring result, and loading data of the first group related to the file stored in the first memory into the second memory based on the first access pattern, based on the application program requesting access to the data included in the first group.

According to various example embodiments, the access pattern may include at least one of an access pattern for loading at least one page included in a loading size configured for each group into the second memory, an access pattern for loading nonconsecutive pages into the second memory based on a page access pattern, an access pattern for reclaiming a plurality of pages at once from the second memory based on a page reclamation pattern, an access pattern for loading consecutive pages into the second memory based on the page access pattern, or an access pattern for loading a plurality of pages included in a fixed loading size into the second memory.

According to various example embodiments, the method may further include: configuring an access pattern for a second group different from the first group, among the data related to the file stored in the first memory as a second access pattern based on the monitoring result, and loading data of the second group related to the file stored in the first memory into the second memory based on the second access pattern, based on the application program requesting access to the data included in the second group.

According to various example embodiments, the second access pattern may include an access pattern that is the same as or different from the first access pattern.

According to various example embodiments, the monitoring may include: determining whether to monitor the access to the data related to the file stored in the first memory based on a load of a processor of the electronic device and a load of the second memory, and monitoring the access to the data related to the file stored in the first memory for the specified time based on determining to monitor the access to the data related to the file.

According to various example embodiments, the method may further include: monitoring the access to the data related to the file stored in the first memory based on the first access pattern being configured for the first group, and configuring a third access pattern for a third group including at least part of the data related to the file based on the monitoring result, based on determining that an error occurs in the first access pattern based on the monitoring result, wherein the third group may be the same as the first group or includes at least part of the first group.

According to various example embodiments, the method may further include determining that the error occurs in the first access pattern based on a number of accesses to the data included in the first group among the data related to the file stored in the first memory satisfying a specified condition.

According to various example embodiments, the method may further include: monitoring the access to the data related to the file stored in the first memory based on the first access pattern being configured for the first group, and configuring a fourth access pattern for a fourth group including at least part of the data related to the file based on the monitoring result based on a structure of the file being changed According to various example embodiments, the method may further include determining that the structure of the file is changed based on new data being added to the file stored in the first memory, the file stored in the first memory being deleted, or at least part of the file stored in the first memory being updated.

According to various example embodiments, the first memory may include a nonvolatile memory, and the second memory may include a volatile memory.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
first memory storing data related to a file;
second memory temporarily storing at least part of the data related to the file; and
at least one processor, comprising processing circuitry, operatively connected to the first memory and the second memory,
wherein the at least one processor is configured to:
determine whether a usage level of the processor satisfies a specified first condition;
determine whether a size of available space of the second memory satisfies a specified second condition;
when the usage level of the processor satisfies the specified first condition and the size of available space of the second memory satisfies the specified second condition, monitor access by an application program to the data related to the file stored in the first memory for a specified time;
when a size of monitoring information collected by the monitoring of access to the data related to the file satisfies a specified third condition, configure a first access pattern for a first group including the at least part of the data related to the file stored in the first memory based on a monitoring result; and
when the application program requests access to data comprised in the first group, load data of the first group related to the file stored in the first memory into the second memory based on the first access pattern,
wherein the monitoring of the access to the data related to the file stored in the first memory is restricted when the usage level of the processor does not satisfy the specified first condition or the size of available space of the second memory does not satisfy the specified second condition.

2. The electronic device of claim 1, wherein the first access pattern comprises at least one of an access pattern for loading at least one page included in a loading size configured for each group into the second memory, an access pattern for loading nonconsecutive pages into the second memory based on a page access pattern, an access pattern for reclaiming a plurality of pages at once from the second memory based on a page reclamation pattern, an access pattern for loading consecutive pages into the second memory based on the page access pattern, or an access pattern for loading a plurality of pages comprised in a fixed loading size into the second memory.

3. The electronic device of claim 1, wherein the at least one processor is configured to configure an access pattern for a second group different from the first group, among the data related to the file stored in the first memory as a second access pattern, based on the monitoring result.

4. The electronic device of claim 1, wherein the at least one processor is configured to:
monitor access to the data related to the file stored in the first memory based on the first access pattern being configured for the first group, and
configure a third access pattern for a third group including at least part of the data related to the file based on the monitoring result, based on determining that an error occurs in the first access pattern based on the monitoring result, and
wherein the third group is the same as the first group or comprises at least part of the first group.

5. The electronic device of claim 4, wherein the at least one processor is configured to determine that the error occurs in the first access pattern based on a number of accesses to the data comprised in the first group among the data related to the file stored in the first memory satisfying a specified four condition.

6. The electronic device of claim 1, wherein the at least one processor is configured to:
monitor access to the data related to the file stored in the first memory based on the first access pattern being configured for the first group, and
configure a second access pattern for a second group including at least part of the data related to the file based on the monitoring result based on a structure of the file being changed.

7. The electronic device of claim 6, wherein the at least one processor is configured to determine that the structure of the file is changed based on new data being added to the file stored in the first memory, the file stored in the first memory being deleted, or at least part of the file stored in the first memory being updated.

8. The electronic device of claim 1, wherein the first memory comprises a nonvolatile memory, and
the second memory comprises a volatile memory.

9. A non-transitory computer-readable storage medium storing instructions which, when executed by at least one processor of an electronic device comprising first memory storing data related to a file and second memory temporarily storing at least part of the data related to the file, cause the electronic device to perform operations comprising:
determining whether a usage level of a processor of the electronic device satisfies a specified first condition;
determining whether a size of available space of the second memory satisfies a specified second condition;
when the usage level of the processor satisfies the specified first condition and the size of available space of the second memory satisfies the specified second condition, monitoring access by an application program to the data related to the file stored in the first memory for a specified time;
when a size of monitoring information collected by the monitoring of access to the data related to the file satisfies a specified third condition, configuring a first access pattern for a first group including the at least part of the data related to the file stored in the first memory based on a monitoring result; and
when the application program requests access to data comprised in the first group, loading data of the first group related to the file stored in the first memory into the second memory based on the first access pattern, wherein the monitoring of the access to the data related to the file stored in the first memory is restricted when the usage level of the processor does not satisfy the specified first condition or the size of available space of the second memory does not satisfy the specified second condition.

* * * * *